Figure 1:
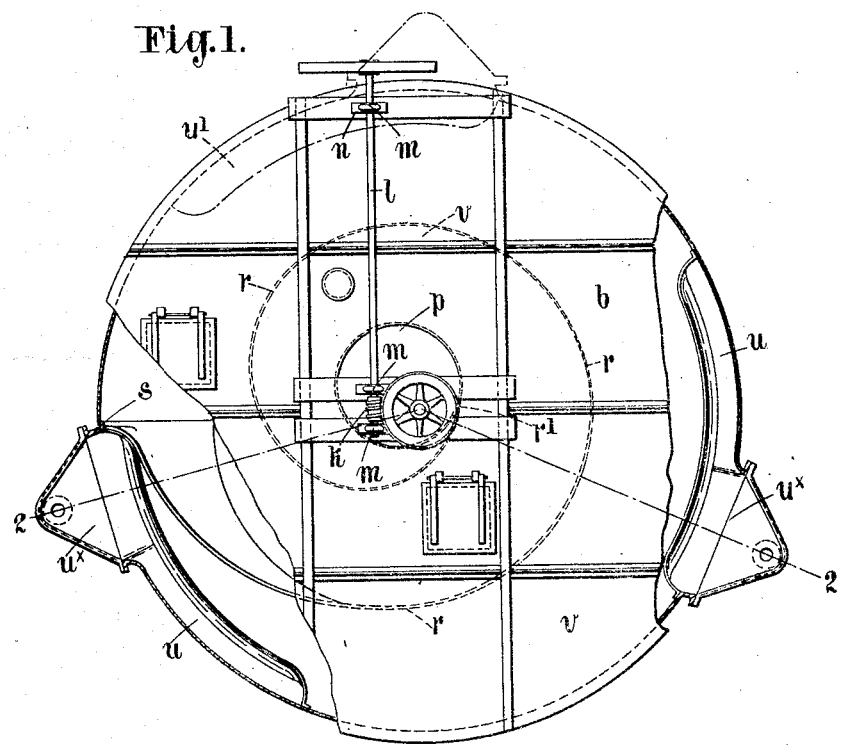

Sept. 1, 1925.                                                              1,551,689
C. G. PETREE
APPARATUS FOR SEPARATING FLOATING AND OTHER IMPURITIES IN
SUSPENSION FROM LIQUIDS
Filed March 25, 1924

Cuthbert George Petree
INVENTOR

By
his Attorney.

Patented Sept. 1, 1925.

1,551,689

UNITED STATES PATENT OFFICE.

CUTHBERT GEORGE PETREE, OF NEW YORK, N. Y.

APPARATUS FOR SEPARATING FLOATING AND OTHER IMPURITIES IN SUSPENSION FROM LIQUIDS.

Application filed March 25, 1924. Serial No. 701,670.

*To all whom it may concern:*

Be it known that I, CUTHBERT GEORGE PETREE, subject of the King of Great Britain and Ireland, residing at New York city, county and State of New York, have invented new and useful Improvements in and Relating to Apparatus for Separating Floating and Other Impurities in Suspension from Liquids, of which the following is a specification.

This invention relates to apparatus for separating floating and other impurities in suspension from liquids and more particularly to that class of apparatus comprising an inverted cone-shaped settling vessel provided with a central cylindrical feed throat extending a short distance beneath the surface of the liquid undergoing treatment; a volute wall or baffle plate also extending a short distance beneath the surface of said liquid and from the outer wall of said feed throat to the inner wall of the settling vessel so as to form a volute path of increasing width; scrapers adapted to be rotated slowly in contact with, or in close proximity to the inner conical surface of the settling vessel to remove any of the precipitate that may have settled there; an overflow at the periphery of said settling vessel for the clarified liquid and an outlet at the apex of the cone at the bottom of said vessel for the removal of said precipitate.

The central feed throat of apparatus of this kind, as heretofore constructed, has been provided with an opening at or near the surface of the liquid in the settling vessel through which the fresh liquid to be treated passes to the volute path carrying with it the lighter impurities and scum that remained on the surface which were removed by an inverted weir or intercepting plate placed obliquely across the volute path, beneath which the clear liquor could pass but along the inclined surface of which the floating impurities were carried to a scum outlet.

In order to preclude the possibility of floating impurities of a flocculent character passing out with the clear liquor the opening in the feed throat at or near the surface of the liquid is closed and the lower edge of the said feed throat or a part of it near the point where the volute path starts is removed so that the liquor fed into the throat will pass into the said volute path through the opening so made which is sufficiently above the lower edge of the volute walls to insure that the fresh hot liquor passing through it will, by reason of its lower density, rise into the first convolution of the volute path.

With this arrangement the floating impurities are trapped within the throat whence they are eventually precipitated when the bubbles that buoy them up have been dispersed, or the said impurities may be otherwise removed by mechanical or other suitable well-known means.

By the present improvements the peripheral scum outlet is dispensed with and greater space made avialable for a longer clear liquor overflow, which may be constituted by the inner lip of a channel formed at the periphery of the settling vessel by bolting or otherwise securing a species of gutter thereto.

This gutter may be formed in sections each of which delivers clear liquor into a separate draw-off pipe or it may be formed in one piece and extend either partially or completely around the settling vessel.

In order that impurities deposited on the walls of the settling vessel near the surface of the liquid undergoing treatment may be removed a sufficient space is left between the outer end of the volute wall and the wall of the settling vessel for the scrapers to pass through for the purpose of removing such deposit to the bottom of the vessel. For this purpose the upper portion of the volute wall is connected to the settling vessel and the portion beneath is either cut away or splayed inwardly.

I will now proceed to more particularly describe my invention with the aid of the accompanying drawings in which—

Figure 2:
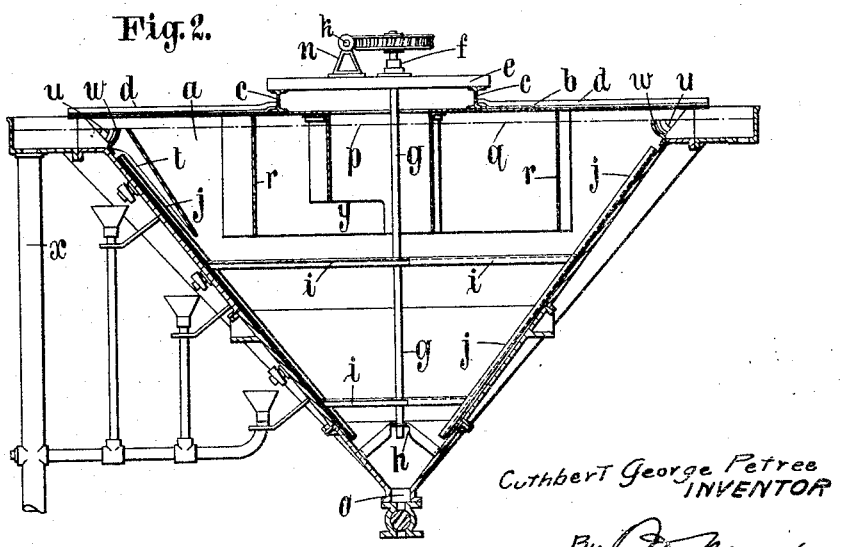

Fig. 1 is a plan view of a preferred form of apparatus for separating floating and other impurities in suspension from liquids, constructed according to the present invention, and Fig. 2 is a vertical section thereof taken on the irregular line 2—2 of Fig. 1.

According to the construction shown in the drawings a suitably supported inverted cone-shaped settling vessel $a$ and a cover $b$ stiffened by girders $c$ $d$.

Cross-beams $e$ mounted on girders $c$ support a bearing $f$ for a vertical shaft $g$ situated on the axis of the conical settling vessel $a$.

A second bearing of steadying ring $h$ for the shaft $g$ is provided at its lower end within the vessel $a$.

This shaft $g$ has arms $i$ that carry scrapers $j$ at their extremities and is rotated slowly by worm gearing $k$ driven by the shaft $l$ journalled in bearings $m$ supported by the standards $n$ on the cross beams $e$.

The scrapers $j$ are thus moved in contact with or proximity to the interior walls of the vessel $a$ so as to cause the sediment deposited upon them to descend regularly to an outlet $o$ at the bottom of the vessel controlled by a suitable valve.

The fresh hot liquor to be treated enters the settling vessel by way of the cylindrical throat $p$ that depends from the under side of the cover $b$ to which it is suitably secured. This cylindrical throat extends a suitable distance beneath the surface $q$ of the liquid in the vessel. The throat $p$ is provided with an opening $y$ at its lower edge and is surrounded by a volute wall $r$ one end of which is connected to it at $r^1$ and the other end, after making a suitable number of convolutions, is connected at or near its upper edge to the inner wall of the conical settling vessel at $s$.

The lower edge of the volute wall at its outer end is splayed inwardly so as to leave a space $t$ between it and the wall of the settling vessel through which the scrapers may operate for the purpose of removing any impurities that may be deposited upon it in the zone occupied by the volute walls.

Gutters or channels $u$ are provided at the periphery of the settling vessel into which the clear liquid after its passage through the volute path $v$ flows over the lip or edge $w$ which is situated at the level of the liquid undergoing treatment. Two of these outlets are shown in the drawings but an additional channel $w^1$ indicated by broken lines may be provided. Each of these gutters or channels is provided with a sink $u^x$ into which the clear liquor is delivered and from whence it is led away by pipes $x$.

In some cases the settling vessel may be provided with a single annular channel completely or partly surrounding it.

The fresh hot liquor fed into the throat passes into the volute path $v$ through the opening $y$ at the lower edge of said throat. The top of this opening is situated sufficiently above the lower edge of the volute walls to ensure that the hot liquor passing through it will by reason of its lower density rise into the first convolution of the volute path whereafter it flows with gradually reduced velocity through the volute path whose width increases at it approaches the edge of the settling vessel and during its passage the suspended matter it contains is gradually precipitated.

Any floating impurities which enter the settling vessel with the fresh hot liquor are trapped within the cylindrical throat $p$ where they remain until the bubbles that buoy them up have been dispersed and they are precipitated or until they are removed by hand or by suitable known mechanical means.

I claim:

1. Apparatus for separating floating and other impurities in suspension from liquids comprising a conical settling vessel, a feed throat extending a suitable distance beneath the surface of the liquid undergoing treatment in said settling vessel, one or more clear liquor outlets, a volute wall extending from the outer wall of said feed throat to the inner wall of the settling vessel to form a volute path between said feed throat and clear liquor outlet, an opening at the lower edge of the feed throat beneath the surface of the liquor undergoing treatment through which the fresh hot liquor fed into said throat can pass into the first convolution of the volute path surrounding it, scrapers, means for rotating said scrapers in close proximity to the inner walls of said settling vessel, and a space between the adjacent end of the volute wall and the inner wall of the settling vessel through which the said scrapers may pass substantially as set forth.

2. Apparatus for separating floating and other impurities in suspension from liquids comprising a conical settling vessel, a feed throat extending a suitable distance beneath the surface of the liquid undergoing treatment in said settling vessel, one or more clear liquor outlets, a volute wall extending from the outer wall of said feed throat to the inner wall of the settling vessel to form a volute path between said feed throat and clear liquor outlet, an opening at the lower edge of the feed throat beneath the surface of the liquor undergoing treatment through which the fresh hot liquor fed into said throat can pass into the first convolution of the volute path surrounding it, scrapers, means for rotating said scrapers in close proximity to the inner walls of said settling vessel and a space between the adjacent end of the volute wall and the said inner wall of the settling vessel through which the said scrapers may pass, said space being formed by splaying inwardly the lower edge of the volute wall at the end adjacent to the inner walls of the settling vessel substantially as set forth.

In testimony whereof, I have signed my name to this specification at this twenty-first day of March 1924.

CUTHBERT GEORGE PETREE.